United States Patent [19]
Dooley, Jr. et al.

[11] Patent Number: 6,039,370
[45] Date of Patent: Mar. 21, 2000

[54] APPARATUS FOR CAPTURING AND DISPOSING OF ANIMAL LITTER

[76] Inventors: John C. Dooley, Jr.; Karen R. Meyerson; John C. Dooley, III, all of 19 Baldwin St., Pennington, N.J. 08534

[21] Appl. No.: 09/239,489

[22] Filed: Jan. 28, 1999

[51] Int. Cl.⁷ .................................................. A01K 29/00
[52] U.S. Cl. ............................................ 294/1.5; 248/99
[58] Field of Search ............................ 294/1.3–1.5, 19.1, 294/22, 23, 28, 55; 248/97, 99; 15/257.1, 257.4; 81/53.11, 177.2, 177.6

[56] References Cited

U.S. PATENT DOCUMENTS

| | | | |
|---|---|---|---|
| 875,078 | 12/1907 | Hoover | 294/22 |
| 1,526,257 | 2/1925 | Thayer | 294/22 |
| 2,720,409 | 10/1955 | Griffith | 294/19.1 |
| 3,606,436 | 9/1971 | Lynch | 294/19 R |
| 3,744,453 | 7/1973 | Deitch | 294/1.5 |
| 3,767,246 | 10/1973 | Corelli et al. | 294/19 R |
| 3,786,780 | 1/1974 | Pezzino | 119/1 |
| 3,810,670 | 5/1974 | Turi | 294/19 R |
| 3,819,220 | 6/1974 | Bredt | 294/19 R |
| 3,872,834 | 3/1975 | Fuhrman | 119/151 |
| 3,912,316 | 10/1975 | Veech | 294/19 R |
| 4,003,595 | 1/1977 | Fano et al. | 294/19 R |
| 4,010,970 | 3/1977 | Campbell | 294/19 R |
| 4,103,953 | 8/1978 | Lachance | 294/19 R |
| 4,185,861 | 1/1980 | Berner | 294/19 R |
| 4,191,414 | 3/1980 | Dameron | 294/1 BA |
| 4,210,351 | 7/1980 | Orofino | 294/1.5 |
| 4,705,310 | 11/1987 | Scripter | 294/1.4 |
| 4,717,186 | 1/1988 | Yoshioka | 294/1.5 |
| 4,852,924 | 8/1989 | Ines | 294/1.5 |
| 5,193,870 | 3/1993 | MacInnis et al. | 294/1.4 |
| 5,335,952 | 8/1994 | Clapper | 294/1.4 |
| 5,503,442 | 4/1996 | Lee | 294/1.4 |

FOREIGN PATENT DOCUMENTS

| | | | |
|---|---|---|---|
| 1019129 | 1/1953 | France | 294/22 |
| 3809-286 | 3/1988 | Germany . | |

Primary Examiner—Dean J. Kramer
Attorney, Agent, or Firm—Watov & Kipnes, P.C.; Kenneth Watov

[57] ABSTRACT

A portable pet toilet device having an elongated pole having first and second ends. The first end provides a handle. Securely mounted on the second end of the pole is a pair of selectively adjustable arms for supporting a disposable receptacle. The arms are adjustable in order to provide the capability of accommodating receptacles of different sizes and shape.

19 Claims, 5 Drawing Sheets

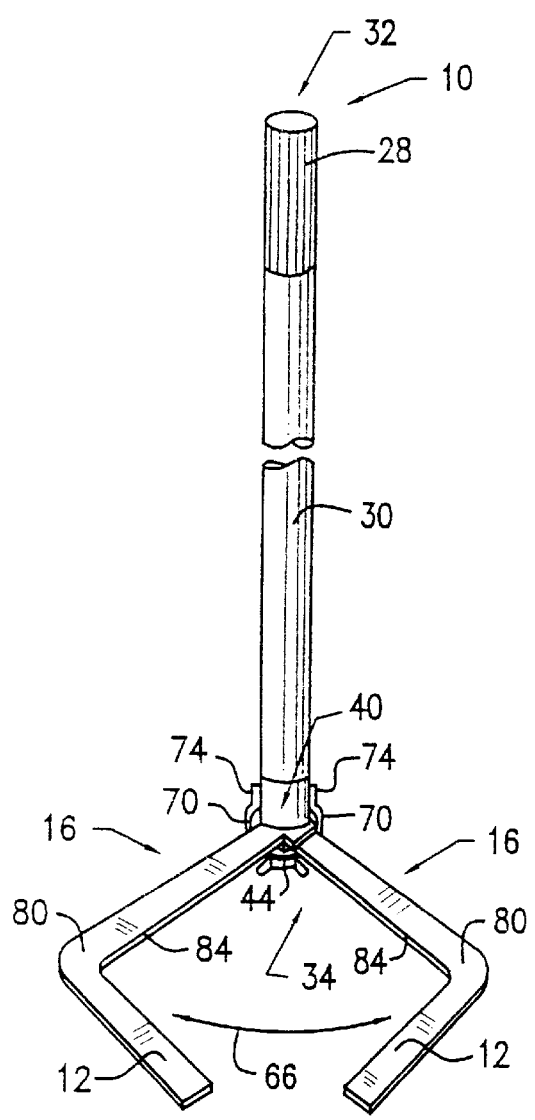
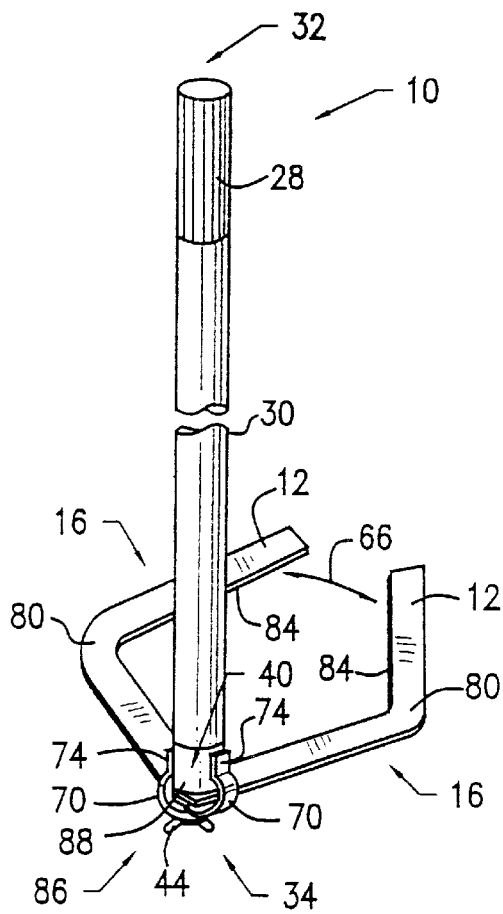
FIG. 1
FIG. 2

APPARATUS FOR CAPTURING AND DISPOSING OF ANIMAL LITTER

FIELD OF THE INVENTION

The present invention is directed to pet sanitation equipment. More particularly, the invention is concerned with an apparatus for the collection and disposal of pet waste.

BACKGROUND OF THE INVENTION

The waste or litter left by domestic animals and pets is unsightly, and more importantly often presents a health hazard. A growing pet population has heightened the public need to properly dispose of such litter. To promote clean public streets and areas, many governmental municipalities, especially those in urban areas have enacted strict ordinances that require the pet owner to collect and properly dispose of the litter or face large fines. Various types of pet litter sanitation devices have been developed in an attempt to provide an efficient and convenient w ay to comply with such ordinances.

Prior art devices have presented certain problems that have limited their usefulness to pet owners. Devices that utilize movable paddles or scoops are often cumbersome to use and unsanitary, often causing embarrassment and discomfort to users. Other devices require the purchase of specific disposable receptacles which is inconvenient and sometimes costly. Some devices being too heavy, easily tire the arms of a user. Devices that include numerous structural elements, linkages, etc., complicate operation, increase fabrication and assembly costs, and are more prone to failure and breakage.

SUMMARY OF THE INVENTION

The present invention is directed to a portable device for collecting animal litter as it falls from the anus of a squatting pet, thereby providing a simple means for capturing and disposing animal litter with minimal mess and embarrassment associated with such task. The device includes adjustable arms to accommodate varying receptacle opening sizes. This feature provides for an efficient, lightweight waste collection device that supports disposable receptacles such as small rigid containers to flexible bags of various sizes and shapes, for example, sandwich bags, small shopping bags and other bags that the user may collect and in turn use with the invention.

In a particular aspect of the present invention, there is provided a portable pet toilet device comprising:
  a) an elongated pole having a first end serving as a handle, and a second end;
  b) a rod;
  c) means for securing said rod to said second end of said pole, with said rod protruding axially away from said second end;
  d) first and second arms, each having one end with a through hole for mounting onto said rod, and each having a free end configured for holding a receptacle; and
  e) means for retaining said first and second arms on said rod in a fixed position, including means for selectively adjusting the distance between said first and second arms to accommodate the size of said receptacle to be held by said arms with said receptacle in an open configuration.

The device of the invention includes an elongated pole having a first end serving as a handle and a second end. The device includes a rod and means for securing the rod to the second end of the pole, with the rod protruding axially away from the second end. First and second arms, each having a mounting end and a support portion for holding disposable receptacles. The device also includes means for retaining the arms on the second end of the pole, including means to allow a user to selectively adjust the distance between the arms. The adjustable feature allows the device to accommodate receptacles, such as plastic bags, of different sizes and shapes. This feature also permits a large size bag to be stretched to a flattened shape permitting adaptation to the low space under a squatting pet for catching the feces as it falls from the pet's anus. The device may optionally include a telescopic handle and a foldable arm assembly for increased portability and compact storage. The cost efficient and effective manner by which the device of the present invention may be constructed, and by which the user may quickly and easily collect and dispose of pet litter, makes the device suitable for pet maintenance use, especially for dog owners who live in urban areas.

In operation of a preferred embodiment of this invention, a disposable receptacle such as a flexible, polymeric bag is placed between the arms. The edge defining the bag's opening is folded over the outer edges of the arms. The arms are adjusted to the desired width depending on the size of the associated bag. The arm-bag portion of the device is then placed with the bag opening below a squatting pet's anus to catch and collect the feces as it falls. After the pet relieves itself, the device is lifted away. As the device is lifted upwardly, the weight of the refuse pulls the bag downward and away from the user. The user can now remove the bag and seal the opening for quick and easy disposal.

BRIEF DESCRIPTION OF THE DRAWINGS

The various embodiments of the invention are described in detail below with reference to the drawings, in which like items are identified by the same reference designation, wherein:

FIG. 1 is a front perspective view of a portable pet toilet device according to a preferred embodiment of the invention;

FIG. 2 is a perspective view from the back and side of the portable pet toilet device;

DETAILED DESCRIPTION OF THE INVENTION

Figures 3, 5:
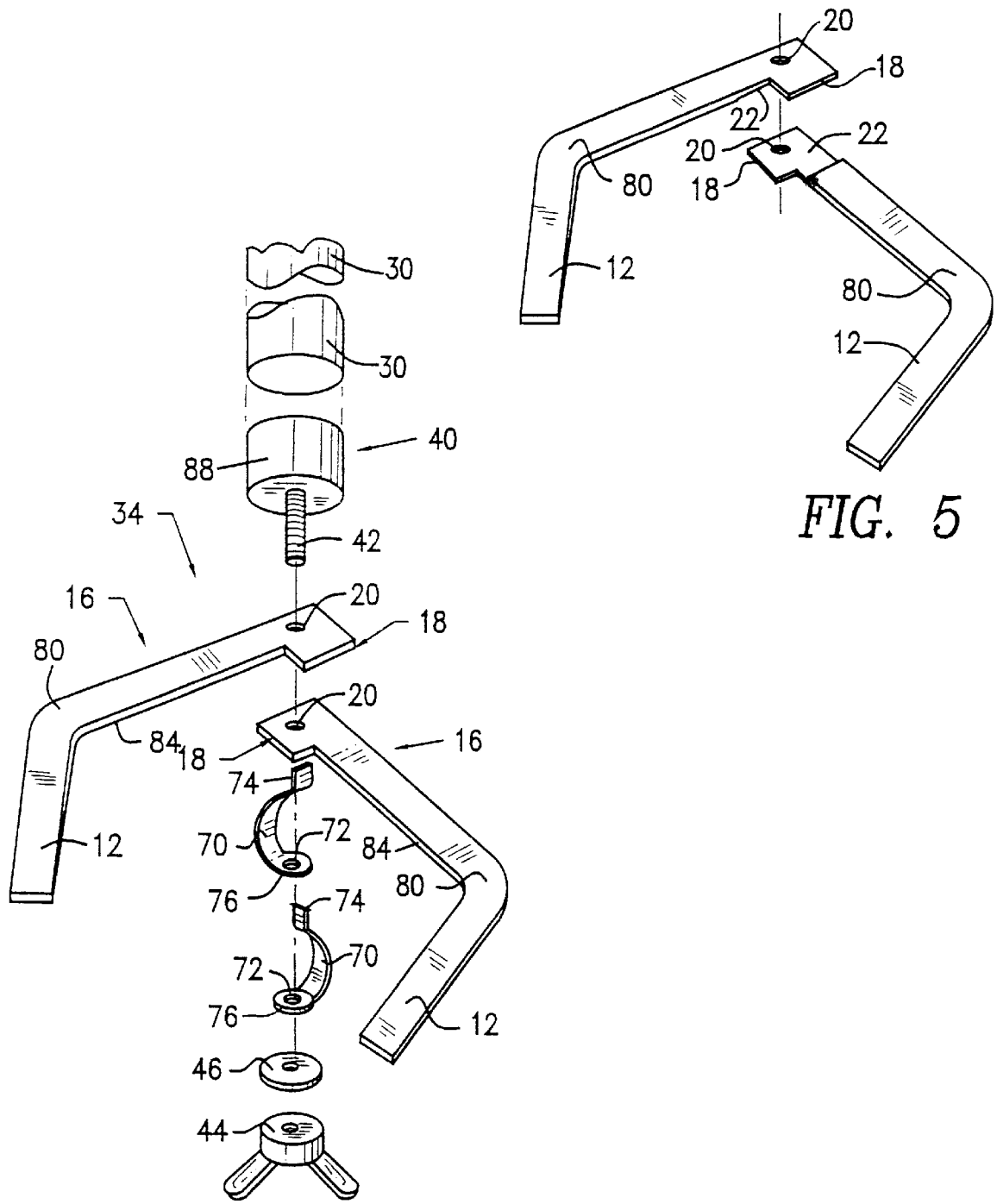
FIG. 3 is a partial pictorial exploded assembly view of arm and bag retaining elements of one embodiment of the invention.
FIG. 5 is a front perspective view of a pair of receptacle supporting arms of an alternative embodiment of the invention.

Referring now to the drawings, and particularly FIGS. 1 and 2, a portable pet toilet device 10 in accordance with the principles of the present invention is shown. The device 10 includes an elongated pole 30 having a handle 28 at the upper end 32 thereof. The pole 30 supports two identically opposing arms 12 at the lower end 34 thereof. The arms 12 are configured to hold a disposable receptacle ready for use in an open configuration as described hereinbelow. The arms 12 are bent at their center positions 80 so that the anterior and posterior section forms an obtuse angle as shown best in FIG. 1. The arms 12 are adapted to be movable radially towards or away from each other to alter the distance between the span 66 as described hereinbelow. A pair of open semi-circular bag retaining members or clips 70 are mounted proximately to the lower end 34 on the rear side 86. The device 10 can be either hand-held or self standing on the ground.

As shown specifically in FIG. 3, an exploded assembly view at the lower end 34 of the device 10 is illustrated. The pole 30 is preferably hollow to save weight and material. The pole 30 may be constructed out of any rigid material such as plastic polymer (extruded or molded), wood, polyvinyl chloride, metal and the like.

In the preferred embodiment of the invention, an end cap 40 with a threaded rod 42 extending axially therefrom is mounted on the lower end 34 of the pole 30. The end cap 40 may be fixed thereto by means of plastic adhesives, screws, pins, dowels and the like. One of the arms 12 is mounted onto the rod 42 through the through hole 20 at the end 18 thereof. The other arm 12 must be longitudinally inverted from the first arm 12 before being mounted onto the rod 42. The mounted arms 12 are positioned on the rod 42 with the concave inside surface 84 facing each other. Each arm 12 is identical to the other in shape and form. This aspect provides a manufacturing advantage. A single mold or fabricating device may be utilized to make the arms 12, thereby generating savings in manufacturing cost. The arms 12 are made of a suitable rigid material such as extruded or molded plastics, metal, wood, and the like.

After the arms 12 are mounted onto the threaded rod 42 by use of washer 46 and wingnut 44 as shown, U-shaped clips 70 are then each mounted at one end in succession onto the rod 42 via holes 72. The clips 70 are positioned on the opposite sides 86 (see FIG. 2) of the pole 30 behind the arms 12, and are arranged in a spaced apart manner from each other. The ends 74 of each clip 70 are spring biased against the sidewall 88 (see FIG. 2). The arms 12 are not limited to the configuration shown, and may include other shapes as recognized by one of ordinary skill in the art.

Mounted arms 12 and clips 70, herein referred to as the arm assembly, are securely retained to the rod 42 by a washer 46 and a wingnut 44 screwed onto the rod 42 as shown in FIG. 3. The wingnut 44 permits the user to quickly loosen or adjust the tension of the arm assembly for easy adjustment of the span 66 between the arms 12. When the wingnut 44 is sufficiently tighten, the arms 12 are fixed into position. The retaining means described here is not limited to the washer 46 and wingnut 44 and may include other known retaining means.

Figure 4:
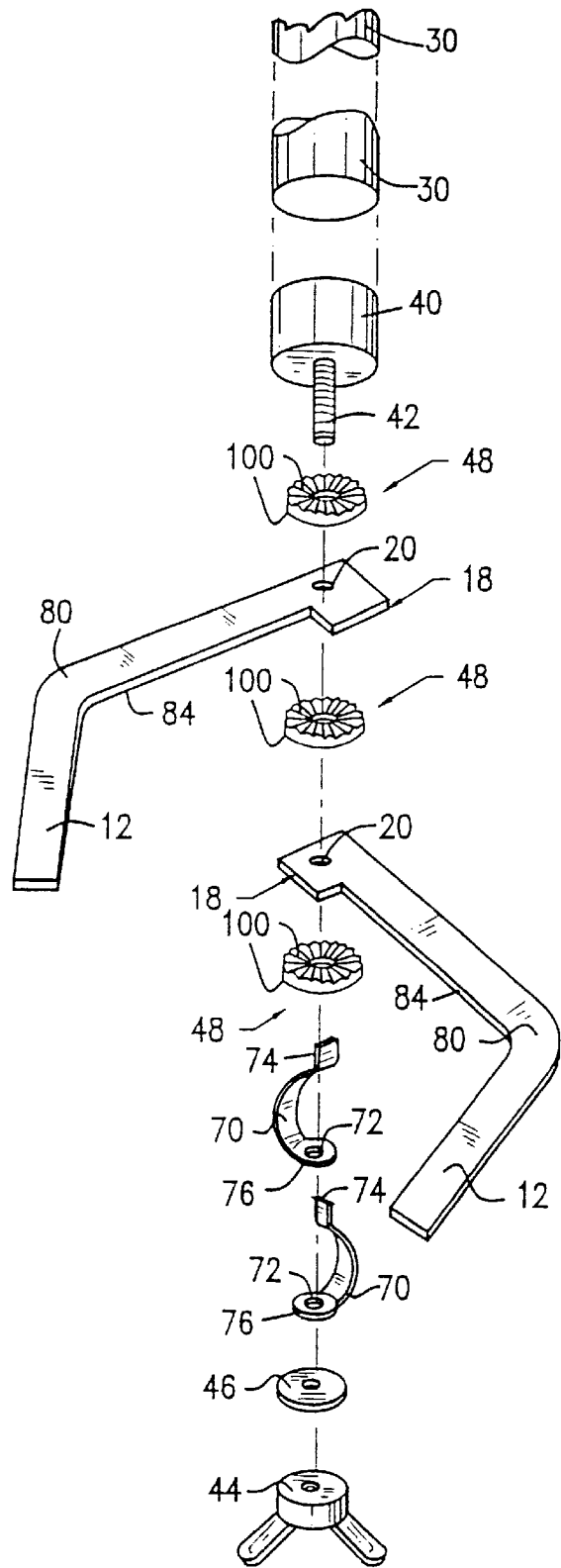
FIG. 4 is a partial pictorial exploded assembly view of an arm and bag retaining assembly of another embodiment of the invention including serrated lock washers for selective adjustment of the arms.

In another embodiment, the retaining means need not be disengaged or loosened to adjust the arms 12. As shown in FIG. 4, a serrated or multi-pointed washer 48 is seated on the rod 42 between the end cap 40 and the end 18 of the arm 12, between the ends 18 of the arms 12 and between the end 18 of arm 12 and the mounted end of the 72 of the clip 70. The serrated portion 100 of the washer 48 permits manual forced incremental snap-like movement of the arms 12, while providing enough resistance to keep the arms 12 securely fixed in position between incremental movements. The means by which the arms 12 may be selectively adjusted is not limited to this configuration, and may include other forms and devices such as ratchets, ball bearings, and the like as may be recognized by one of ordinary skill in the art.

Referring to FIG. 5, an alternative embodiment for the arms 12 is shown. The end 18 of each arm 12 includes a stepped down platform 22. The platform 22 permits the arms 12 to be coupled together to lie in the same horizontal plane. The arms 12 are mounted with the platforms 22 in contact with one another, on the threaded rod 42 in essentially the same manner as described hereinabove.

Figure 6:
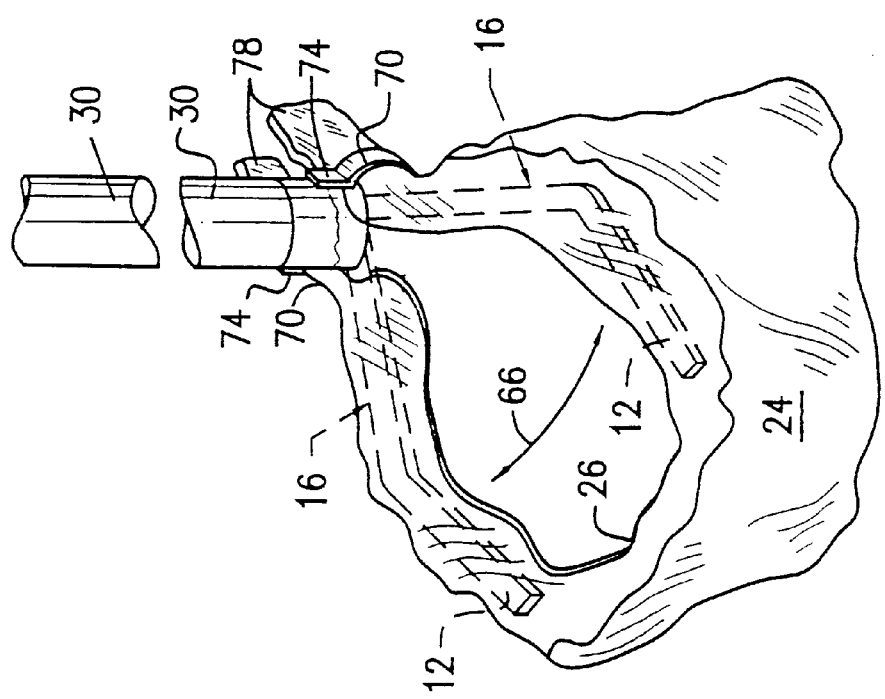
FIG. 6 is a partial pictorial view of one embodiment of the invention with a disposable bag mounted thereon.

Referring to FIG. 6, the preferred embodiment of the invention is shown with a disposable bag 24 of flexible material mounted on the arms 12. The disposable bag 24 is made of any available flexible material such as plastic, cloth, paper and the like. The device 10 permits the two arms 12 to be moved towards or away each other to accommodate bags of different sizes and shapes. The user may save and utilize a wide variety of bags from grocery stores, retail stores, eateries and the like. The device 10 is not limited to any particular source of bags. The adjustable feature of the arms 12 also permits the user to adjust the bag tension and the size of the cross-sectional catchment area to meet the needs of the pet. If the same size bag is used during the next outing, the arms 12 do not need to be readjusted.

The two semi-circular bag retaining clips 70 serves to permit portions 78 of the mounted bag 24 to be securely held between the biased ends 74 and the sidewall 88 of the end cap 40. As the gathered portion 78 is pulled through the clips 70, the edge of the opening 26 of the bag 24 is pulled against and overlapping the arms 12, providing a tighter and more secure fit.

Figure 7:
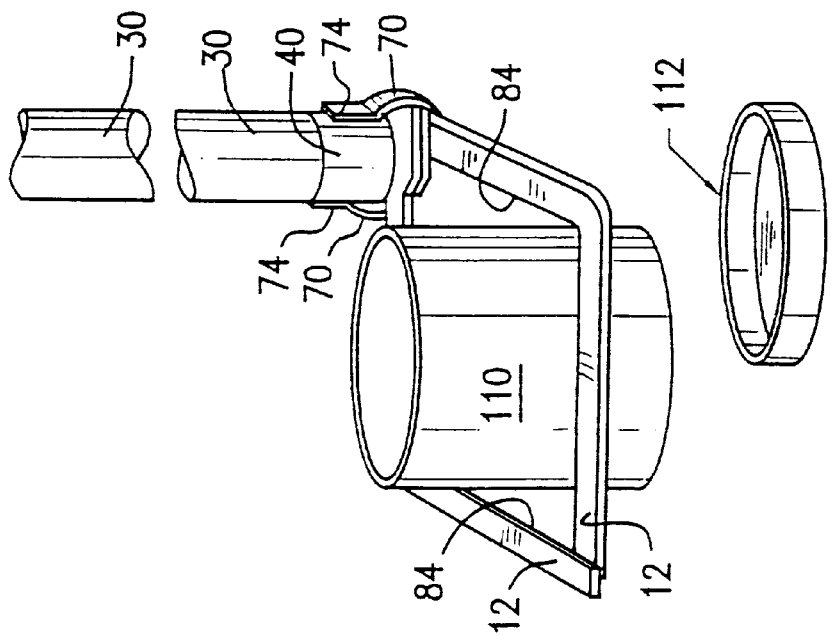
FIG. 7 is a partial pictorial view of one embodiment of the invention with a container frictionally held between the receptacle supporting arms.

The device 10 can also be utilized to hold a rigid container 110 as shown in FIG. 7. With this capability, the user can collect urine or stool samples for veterinary medical purposes. The arms 12 can be adjusted to securely clasp the wall of the container 110 and frictionally hold it in a pincer-like manner. The device 10 can be maneuvered in essentially the same way as with a bag receptacle as described hereinbelow.

Figure 8:
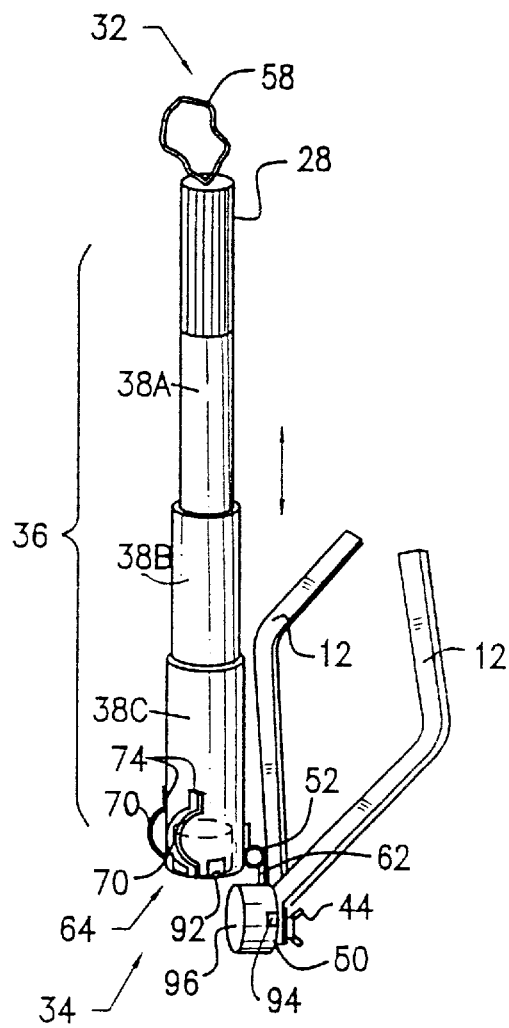
FIG. 8 is a side pictorial view of an alternative embodiment of the invention including a telescopic pole and a fold-up arm assembly.
Figure 9:
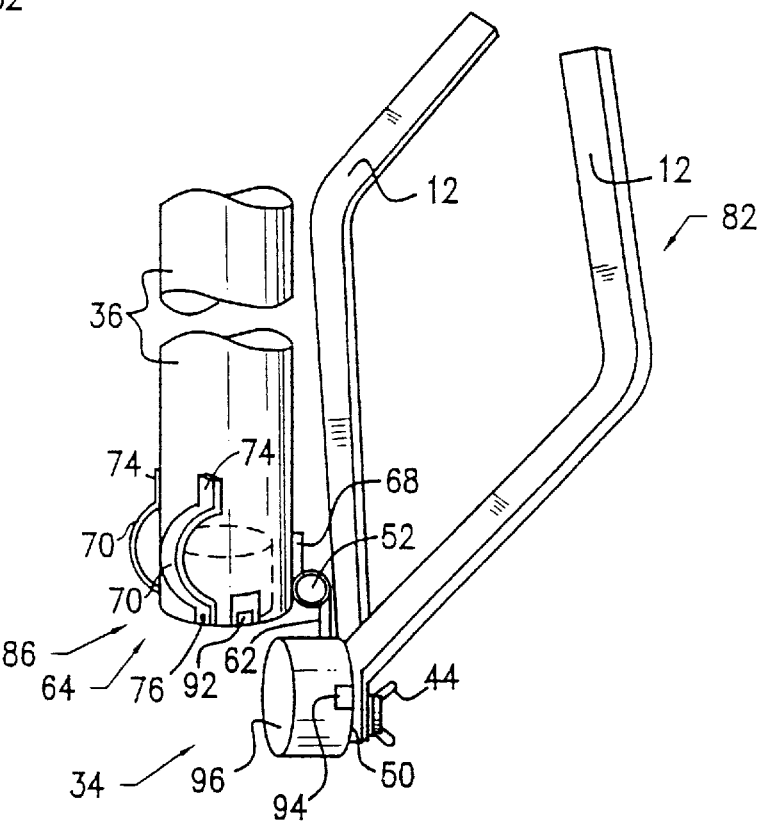
FIG. 9 is an enlarged pictorial view of a hinge assembly of the embodiment shown in FIG. 8.

Referring to FIGS. 8 and 9 of the drawing, an alternative embodiment of the present invention is shown. In another embodiment, an alternative telescopic pole 36 can be retracted to a shorter length, for example during non-use of device 10, which is especially significant for those residing in crowded urban areas and/or in modest living quarters. In the retracted state, the user can carry the device 10 in a knapsack or store it in a small closet.

In this example, the pole 36 may include two or more segments, with three being the preferred number of segments such as 38A, 38B, and 38C. Segment 38A makes up the uppermost segment and includes a handle 28 at the upper end 32 which may optionally include a loop wrist cord 58. The other end of the segment 38A snugly fits into the cavity defined by the walls of middle segment 38B. The lower end of segment 38B snugly fits into the cavity defined by the walls of segment 38C. Segments 38A and 38B are configured to reversibly slide within the associated segments 38B, and segment 38B within 38C, respectively. The pole 36 may be retracted to a shorter length or extended to its fill length. This feature allows convenient compact carry and storage.

The embodiment of FIG. 8 also includes a hinge assembly for quick fold-up of arms 12, and storage. As shown best in FIG. 9, a hinge 52 is securely mounted to an end plug 50 by a plate portion 62. The hinge 52 is also securely mounted to the front side 82 of the segment 38C proximate the lower end 34 of the telescopic pole 36 by a plate portion 68. The hinge 52 thereby provides pivot movement of the arm assembly. The top portion 96 of the end plug 50 is configured to snugly fit into a cavity 64 defined by the end walls of segment 38C. The end plug 50 includes a threaded rod (not shown) extending axially therefrom. The arms 12 are mounted on the end plug 50 in the same manner as with the end cap 40 as described hereinabove. A torsional spring (not shown) is mounted in the hinge 52 to normally bias the arm assembly into the upright or storage position (shown in FIG. 8). The bag retaining clips 70 are securely fastened directly by the mounted ends 76 to the lower end 34 of the telescopic pole 36. The clips 70 may be fastened to the pole 36 by screws, bolts, pins and the like.

To urge the arm assembly into the horizontal position, the arms 12 are moved downward to cause the top portion 96 of the end plug 50 to rotate and be inserted into the cavity 64 of segment 38C. A releasable clasp 92 forming part of the lower wall of segment 38C is configured to snap into a slot 94 on the end plug 50. When the end plug 50 is properly seated within the cavity 64, the clasp 92 becomes secured with the associated slot 94, to lock the arms 12 in a horizontal plane or at 90° to segments 38A, 38B, and 38C. To return the arm assembly into the upright or storage position, the clasp 92 is displaced to clear the slot 94 and the spring-biased arm assembly pivots about the hinge 52 into the upright or storage position. The two features of this embodiment, as shown in FIG. 8, provide the user with convenience and portability. A loop wrist cord 58 may be optionally added to the upper end 32 of the handle 28 for allowing the device 10 to be worn around the wrist as previously mentioned.

The operation of the preferred embodiment of the portable pet toilet device 10 of the present invention will now be explained with references to FIGS. 1–3 and 6. When the need arises to take a pet for a walk outdoors, the user positions a bag 24 between the arms 12 with the open portion facing up. The edge of the bag 24 is folded over the outer perimeter of the arms 12. The user may optionally roll the edges around the arms 12 to take up any slack in the bag 24. If required, the arms 12 are adjusted to accommodate the size and shape of the bag. Once the arms 12 are adjusted to the desired position, the portion 78 of the bag 24 proximate the end 34 of the pole 30 is gathered and pulled until the bag 24 is firmly secured around the arms 12. The bag gathers 78 are then pulled through the corresponding clips 70 and securely retained therein.

When the pet squats to begin a bowel movement, the bag portion of the device 10 is lowered down under the rump of the pet. The open portion of bag 24 is placed into position to capture the litter as it falls from the pet's anus. The bag 24 may be suspended between the pet and the ground, by positioning of handle 30, which is preferred, or the handle 30 lowered to have the bag 24 and arms 12 rest on the ground underneath the rump of the pet. The bag 24 captures the expelled litter from the pet.

When the pet completes its bowel movement, the device 10 is lifted up and away from the pet. The litter is gathered at the bottom of the bag 24 and away from the edge. The gathered portion 78 of the bag 24 is released from the clips 70. With the arms 12 positioned a height from the ground, the weight of the litter typically draws the walls of the bag 24 downward, allowing the bag 24 to unroll or be released from the arms 12. The user then removes the bag 24 from between the arms 12 to tie off the open end, for a quick and easy disposal thereof.

Although various embodiments of the invention have been shown and described, they are not meant to be limiting.

Those of skill in the art may recognize various modifications to these embodiments, which modifications are meant to be covered by the spirit and scope of the appended claims.

What is claimed is:

1. A portable pet toilet device comprising:

an elongated pole having a first end serving as a handle, and a second end;

a rod;

means for securing said rod to said second end of said pole, with said rod protruding axially away from said second end;

first and second V-shaped arms, each having flat top and bottom surfaces which are substantially wider than the thickness thereof, each having one end with a through hole for mounting onto said rod and being positioned with an inside corner portion of each arm in opposition to one another, and each having a free end configured for holding a receptacle; and means for retaining said first and second arms on said rod in a fixed position, including means for selectively adjusting the distance between said first and second arms to accommodate the size of said receptacle to be retained by said arms with said receptacle in an open configuration.

2. The device of claim 1, wherein said securing means includes:

an end cap having an open top and a closed bottom;

said rod being secured at one end to a central portion of the bottom of said end cap, and protruding axially away therefrom; and said open top of said end cap being configured to fixably mount said end cap on said second end of said pole.

3. The device of claim 1, wherein:

said rod includes screw-like threads; and said retaining means includes a washer and a wingnut being configured to securely screw on said threaded rod.

4. The device of claim 1, wherein said receptacle is a bag of flexible material.

5. The device of claim 1, wherein said receptacle is a rigid container being frictionally secured between said arms.

6. The device of claim 1, further including attachment means for securely retaining the receptacle on the arms.

7. The device of claim 6, wherein said attachment means includes:

one of more U-shaped clips, each having a first end and a second end;

said first end being mounted on said rod; and said second end being normally biased against side portion of said second end of said pole for retaining a portion of a flexible bag receptacle to keep said bag receptacle from slipping off of said first and second arms.

8. The device of claim 1, further including a loop of cord fastened to a top end of said handle in order to provide a carrying aid.

9. The device of claim 1, wherein said pole includes telescopic sections for providing compact transport and storage.

10. The device of claim 1, further including means for selectively folding said first and second arms in an upright position against said pole, for transport and storage, and for later folding said first and second arms downwardly away from said pole, with the longitudinal axes of said pole and arms being 90° to one another.

11. The device of claim 10, wherein said securing means includes:
a tubular member having a hollow cavity, and an open bottom end of said tubular member being said second end of said pole;
an end plug having top, bottom, and side surfaces;
said rod being secured at one end to a central portion of the bottom surface of said end plug, and protruding axially away therefrom;
said top side of said end plug being configured for a snug fit within said hollow cavity through said open bottom end of said tubular member; and
means for releasably securing said end plug within said cavity.

12. The device of claim 11, wherein said releasable securing means includes:
one or more releasable clasps being attached to said side surfaces of said second end of said pole; and
one or more slots disposed on said side surfaces of said end plug, each being configured for receiving and retaining said corresponding releasable clasp.

13. The device of claim 11, wherein said selectively folding means includes:
a hinge having first and second ends;
said first end of said hinge being mounted on second end of said pole; and
said second end of said hinge being mounted on said end plug.

14. The device of claim 13, wherein said hinge is spring-biased.

15. The device of claim 10, further including attachment means for securely retaining the receptacle on said arms.

16. The device of claim 15, wherein said attachment means includes:
one or more U-shaped clips, each having a mounted end and a free end;
said mounted end being fixably attached to said pole proximate the second end of said pole; and
said free end being normally biased against a side portion of said pole for retaining a portion of a flexible bag receptacle to keep said bag receptacle from slipping off of said first and second arms.

17. The device of claim 1, wherein said means for selective adjustment includes a plurality of serrated lock washers, each being mounted on said rod between said second end of said pole and said first and second arms, between said arms, and between said arms and said retaining means.

18. The device of claim 1, wherein said handle is provided with a grip at its top end.

19. The device of claim 1, wherein said arms are made of rigid plastic polymer composite.

* * * * *